(12) United States Patent
Halevi et al.

(10) Patent No.: US 9,497,579 B2
(45) Date of Patent: *Nov. 15, 2016

(54) ADAPTER DEVICE TO ALLOW THE MONITORING OF MEDIA EXPOSURE ON CONSUMER DEVICES

(71) Applicant: MOBILE RESEARCH LABS LTD., Hod Hasharon (IL)

(72) Inventors: Omri Halevi, Mazkeret Batya (IL); Aron Weiss, Ramat HaSharon (IL)

(73) Assignee: Mobile Research Labs Ltd., Hod HaSharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,411

(22) Filed: Nov. 23, 2015

(65) Prior Publication Data

US 2016/0088426 A1 Mar. 24, 2016

Related U.S. Application Data

(63) Continuation-in-part of application No. 14/499,298, filed on Sep. 29, 2014.

(60) Provisional application No. 61/886,083, filed on Oct. 3, 2013.

(51) Int. Cl.
| H04R 1/10 | (2006.01) |
| H04W 4/00 | (2009.01) |
| H04R 1/06 | (2006.01) |
| H04R 5/04 | (2006.01) |

(52) U.S. Cl.
CPC .............. *H04W 4/008* (2013.01); *H04R 1/06* (2013.01); *H04R 1/10* (2013.01); *H04R 1/1033* (2013.01); *H04R 5/04* (2013.01); *H04R 2201/107* (2013.01); *H04R 2420/07* (2013.01)

(58) Field of Classification Search
CPC ............................... H04R 1/1033; H04R 5/04
USPC ............................................ 381/56, 74, 384
See application file for complete search history.

(56) References Cited

U.S. PATENT DOCUMENTS

| 3,942,190 | A | * | 3/1976 | Detwiler | ............. | G11B 5/4969 |
| | | | | | | 226/113 |
| 2005/0094841 | A1 | * | 5/2005 | Mllani | .................. | H01R 31/02 |
| | | | | | | 381/384 |
| 2007/0286436 | A1 | * | 12/2007 | Isobe | .................... | G06F 1/1616 |
| | | | | | | 381/107 |
| 2015/0098580 | A1 | * | 4/2015 | Halevi | ..................... | H04R 1/06 |
| | | | | | | 381/74 |

* cited by examiner

*Primary Examiner* — Paul S Kim
*Assistant Examiner* — Katherine Faley
(74) *Attorney, Agent, or Firm* — Dr. Hanan Farber Patent Agent Ltd.

(57) ABSTRACT

Adapter devices are provided herein which are connectable to an audio connector of a media device. The audio connector of the media device is configured to receive an audio input from an external microphone and to output an audio output signal to an earphone. The adapter device includes a male plug adapted to be plugged into the audio connector of the media device, a female receptacle electrically connected to the male plug. The female receptacle is adapted to mate with an audio plug of a listening device. The adapter includes an audio signal coupling configured to couple a portion of the audio output signal from the audio connector of the media device into an input of the media device.

19 Claims, 4 Drawing Sheets

ADAPTER DEVICE TO ALLOW THE MONITORING OF MEDIA EXPOSURE ON CONSUMER DEVICES

CROSS REFERENCE TO RELATED APPLICATIONS

The present application is a continuation-in-part application of patent application Ser. No. 14/499,298 filed 29 Sep. 2014 in the United States Patent and Trademark Office by the present inventor, the disclosure of which is incorporated herein by reference.

BACKGROUND

1. Technical Field

The present invention relates to an audio adapter device.

2. Description of Related Art

Media research companies may provide measurements of media exposure on consumer devices. Media exposure may be measured in the vicinity of the media devices by recording ambient audio using a built-in microphone of the media devices.

Infotainment is a portmanteau of the terms information and entertainment to describe information-based media content or programming that also includes entertainment content in an effort to enhance popularity with audiences and consumers. Infotainment applications may include identification services and/or applications that use the built-in microphone of a personal media device, e.g. smart-phone, tablet computer to sample of music or other media being played in the vicinity of the personal device.

Both media research and infotainment may create an acoustic fingerprint based on the sample, and compares the acoustic fingerprint against a central database for a match, or look for pre-inserted watermark, i.e. encoding, which includes meta-data as to the content in which the acoustic fingerprint or pre-inserted watermark are embedded into. If an identification is made, information such as the artist, song title, and album may be sent to the user or any other designated service can be provided.

BRIEF SUMMARY

Various adapter devices are provided herein which are connectable to an audio connector of a media device. The audio connector of the media device is configured to receive an audio input from an external microphone and to output an audio output signal to an earphone. The adapter device includes a male plug adapted to be plugged into the audio connector of the media device, a female receptacle electrically connected to the male plug. The female receptacle is adapted to mate with an audio plug of a listening device. The adapter includes an audio signal coupling configured to couple a portion of the audio output signal from the audio connector of the media device into an input of the media device.

The adapter device may include a wireless transmitter having an electrical input and an electromagnetic wireless output signal. The electrical input is operably connectable to the audio connector of the media device. The wireless transmitter responsive to the audio output signal from the audio connector of the media device transmits the electromagnetic wireless output signal. An electromagnetic receiver in the media device is configured to receive the electromagnetic wireless signal responsive to the audio output signal. The electromagnetic wireless signal may be an optical frequency or a radio frequency signal. The wireless transmitter may be a Bluetooth™ transmitter and the electromagnetic receiver in the media device is a Bluetooth™ receiver. Alternatively or in addition, the audio signal coupling may include a circuit, wherein the circuit includes at least one of a reactive or a resistive component configured to couple the audio output signal from the media device into an audio input of the media device. A multi-core cable may connect the male plug to the female receptacle. The wireless transmitter and/or circuit may included in at least one of the male plug, the female receptacle and the multi-core cable. The female receptacle of the adapter is adapted to mate with an audio plug of a headset, an audio plug of a speaker or an audio plug of a sound card.

Various methods are provided herein for enabling monitoring audio played on a media device which includes a built-in microphone and an audio connector. The built-in microphone is disabled when an audio jack is plugged into the audio connector of the media device. An adapter device is provided which includes a male plug adapted to be plugged into the audio connector of the media device and a female receptacle electrically connected to the male plug. The female receptacle is adapted to mate with an audio plug of the listening device. The male plug may be mated with the audio connector of the media device. The audio output signal is split and/or coupled at least in part, from the audio connector of the media device into an input of the media device. The coupling/splitting may be performed by a wireless transmitter within the adapter device. The wireless transmitter has an electrical input and an electromagnetic wireless output signal. An electrical input of the wireless transmitter may be connected to the audio connector of the media device. Responsive to the audio output signal from the audio connector of the media device, an electromagnetic wireless signal is transmitted. The electromagnetic wireless signal is received by an electromagnetic receiver in the media device. The wireless transmitter within the adapter device and the wireless receiver integral to the media device may be paired and connected. The coupling/splitting enables monitoring audio content being played on the media device whilst a user of the media device listens to the audio content. The mating enables monitoring audio content being played on the media device whilst a user of the media device listens to the audio content. The mating provides another portion or split signal of the audio output of the media device to the listening device such as an earphone, speaker or sound card.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

Figure 1:
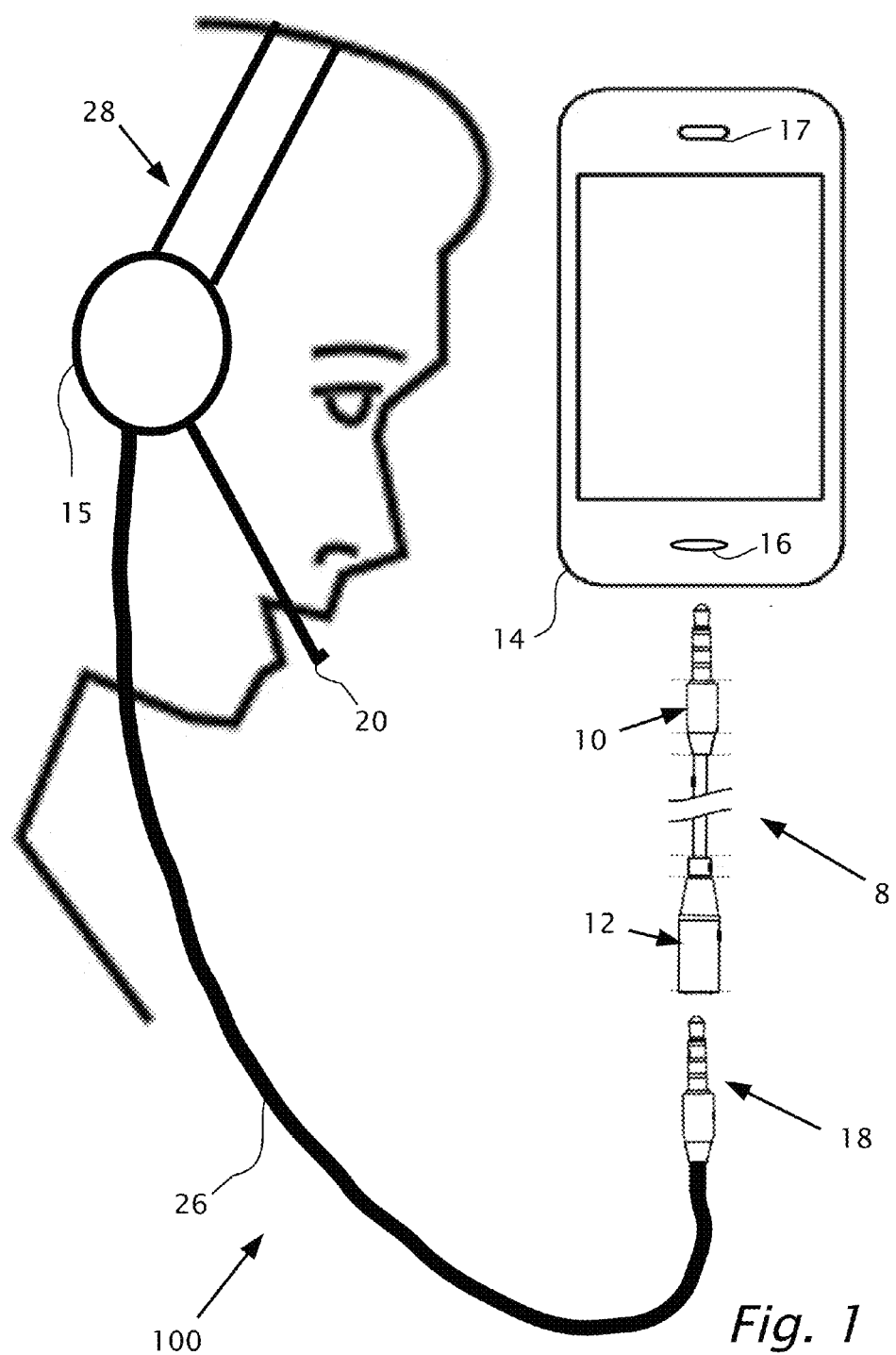
FIG. 1 shows a smart-phone, a person using a headset and an adapter device according to an embodiment of the present invention mated between the smart-phone audio connector and the headset.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, a consumer may be consuming media, e.g. listening to radio or watching a TV show. Media research companies and/or infotainment applications may use the built-in microphone of a media device, e.g. smart-phone, to sample ambient sound being played either by the media device or other ambient sound, e.g television, cinema. However, while using an attached earphone on the media device, the built-in microphone of the media device may be disabled and also not able to sample the played audio. The monitoring of media exposure then poses a challenge if the person is using a headset plugged into the audio connector of the media device. The audio signal from the earphone is too low in volume to be monitored using the microphone of the headset. Moreover, if the person is consuming ambient media, e.g. listening to radio and/or watching a movie, from for example the media device using a speaker plugged in to the audio connector of the media device then the built-in microphone of the media device is normally disabled, and the media device will not be able to record the ambient media. If the person is listening to FM radio using the built in speaker of a media device such as a smart-phone then, an earphone or other device is plugged into the audio connector of the media device to provide an aerial or antenna for the FM broadcast. Again, the built-in microphone is disabled and the content being listened to in this way will not be monitored.

A similar problem occurs when using song or other content identification service such as the SHAZAM™ application. If a person using SHAZAM™ is consuming media, e.g. listening to a song, and is using earphones plugged into the audio connector of a smart-phone, the content identification service will be unable to record any portion of the song and identify the song.

Thus there is a need for and it would be advantageous to have an adapter device which allows monitoring of audio played on the media device while a person is using earphones plugged into the audio connector of the media device.

Referring now to the drawings, reference is now made to FIG. 1 which shows a system 100 of a user using a media device 14 which includes an adapter device 8, according to a feature of the present invention. Media device 14 may be for example an iPhone™, iPad™, hand held tablet device, Android™ operating system enabled device, laptop computer or smart-phone. Adapter device 8 includes a male plug 10 and female receptacle 12. The user is shown wearing a headset 28 which includes a headphone 15 and a microphone 20, by way of example. Connection to headset 28 is via cable 26 which is terminated by audio plug 18. Audio plug 18 may be plugged into female receptacle 12. Female receptacle 12 and male plug 10 are connected together electrically via a multi-core cable. Male plug 10 may be plugged into an audio connector (normally a female audio receptacle not shown) of media device 14. Media device 14 includes an internal speaker 17 and internal microphone 16. As shown in FIG. 1, connectors are shown as 3.5 millimeter TRRS plugs. However, other types of connectors may be used such as micro USB™, Lightning™ (Apple™) or any other headset to device connector. Optionally, an external speaker or stereo speakers (not shown) may be plugged into female receptacle 12 instead of headset 28 using a different audio plug similar to audio plug 18.

Figure 2A:
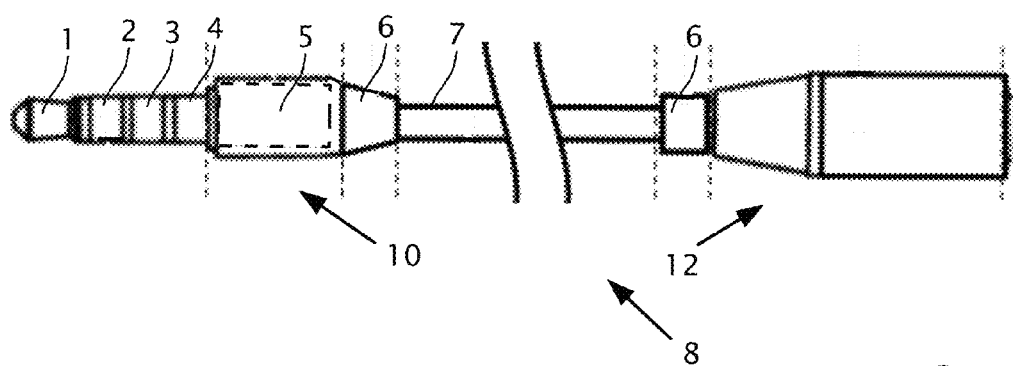
FIG. 2a shows further details of the adapter device of FIG. 1.

Reference is now made to FIG. 2a which shows adapter device 8 in more detail, according to a feature of the present invention. Female receptacle 12 and male plug 10 may be connected together electrically via a multi-core cable 7 and mechanically by respective sleeves 6. Male plug 10 may include tip 1 and collars 2, 3 and 4. Tip 1 and collar 2 provide connection to left and right stereo audio output from the audio connector of media device 14. Collar 3 is the ground connection and collar 4 is an external microphone input connection to media device 14. Different devices may require different wiring between collars 1-4 and wire cores of multi-core cable 7. Male plug 10, according to a feature of the present invention includes a coupling circuit 5. Circuit 5 may similarly be accommodated in female receptacle 12 in other embodiments of the invention.

Figure 2B:
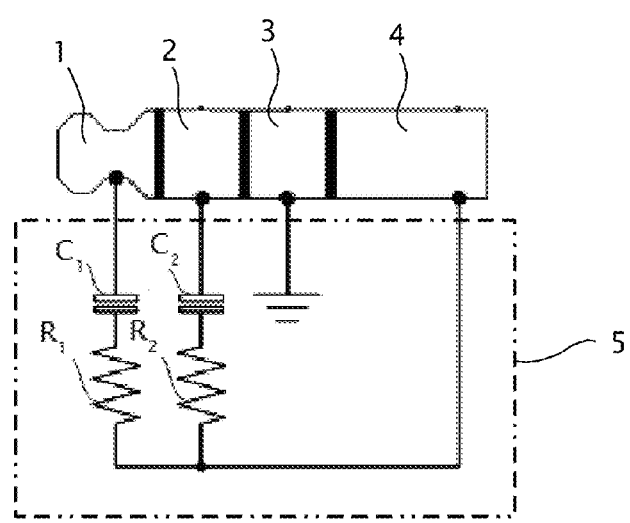
FIG. 2b shows an internal circuit of the adapter device of FIGS. 1 and 2, according to a feature of the present invention.

Reference is now made to FIG. 2b which shows coupling circuit 5 in greater detail, according to a feature of the present invention. According to the circuit of circuit housing 5, the left and right audio output, tip 1 and collar 2 respectively are coupled to collar 4 (provides the external microphone connection to media device 14) via series capacitors and resistors $R_1/C_1$ and $R_2/C_2$ respectively. The component values series capacitors and resistors $R_1/C_1$ and $R_2/C_2$ are chosen so that an acceptable level of audio from the left and right audio output, tip 1 and collar 2 is coupled into collar 4. Alternative reactive (using inductors and/or capacitors) and/or resistive circuits may be used as is well known in the field of electronics for implementing coupling circuit 5.

Figure 3:
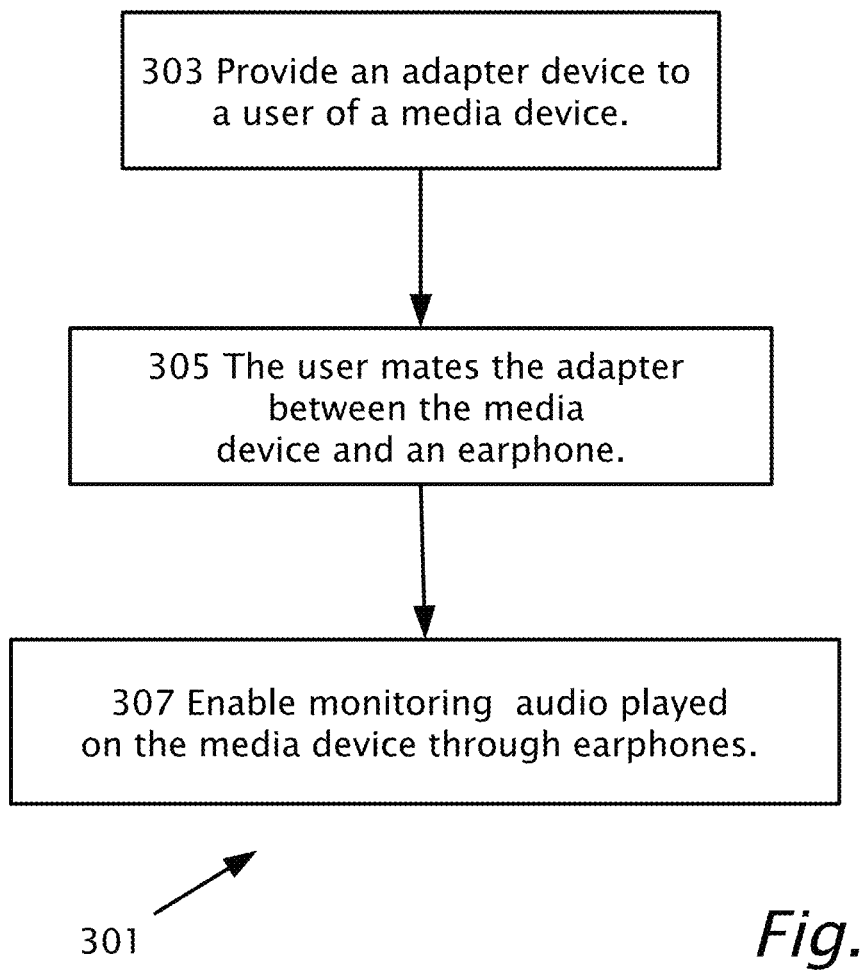
FIG. 3 shows a method, according to a feature of the present invention.

Reference is now made to FIG. 3 which shows a method 301, according to a feature of the present invention. In step 303, a media research company or other third party, may provide device 8 to a user. In step 305, the user plugs male jack 18 of the earphones/headset/speaker into female receptacle 12 of device 8 and male jack plug 10 of device 8 is plugged into the audio connector of media device, e.g smart-phone 14.

Plugging in of adapter device 8 into media device 14 even without headset 28 plugged into device 8 provides an audio input by coupling to collar 4 which is a microphone input by capacitors and resistors $R_1/C_1$ and $R_2/C_2$ to tip 1 and collar 2 respectively which provide an stereo audio signal to earphones 15 or speakers when connected.

However, without device 8, a user who normally watches and/or listens to media content on device 14 with headset 28 or speakers plugged into media device 14, may cause internal microphone 16 of media device 8 to be muted, disconnected or otherwise disabled. Therefore, a media monitoring company is unable to monitor (step 307) the audio listened to by the user of media device 14 even if external speakers are being used plugged into the audio connector of media device 14. The plugging in of device 8 between media device 14 and headset 28 (step 305), allows the media research company or other service such as SHAZAM™ to monitor (step 307) the audio content of media being played on media device 14 whilst the user listens to the audio content on earphone 15 or speaker. Similarly, in the field of information entertainment, applications such as SHAZAM™ may successfully monitor the media being consumed and provide to the user information regarding the media being consumed even when the user is listening with earphones 15.

Figure 4A:
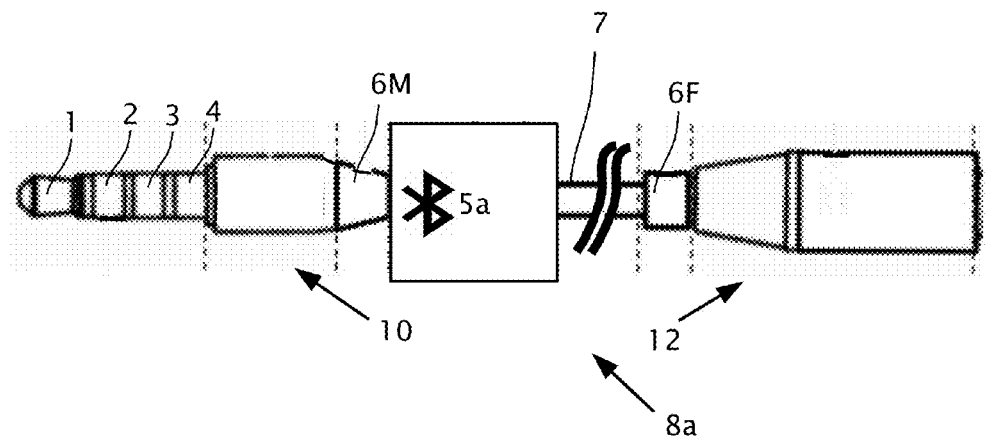
FIG. 4a shows an alternative adapter device, according to other features of the present invention.
Figure 4B:
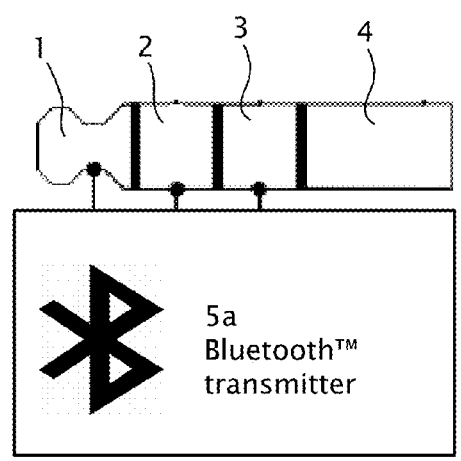
FIG. 4b shows an example of schematic electrical audio output connections to audio inputs of a wireless transmitter, e.g Bluetooth' integral to the adapter shown in FIG. 4a, according to a feature of the present invention.

Reference is still made to method 301 and FIG. 1 and now also to FIG. 4a, which show an alternative adapter device 8a, according to other features of the present invention. FIG. 4b shows an example of schematic electrical audio output connections to audio inputs of a wireless transmitter, e.g Bluetooth™ integral to adapter 8a. Like adapter device 8, adapter device 8a has male plug 10 which may include tip 1 and collars 2, 3 and 4. Tip 1 and collar 2 may provide connection to left and right stereo audio output from the audio connector of media device 14. Collar 3 may be the ground connection and collar 4 may be an external microphone input connection to media device 14 which connects when male plug 10 is plugged into media device 14. Connection to headset 28 may be via cable 26 which is terminated by audio plug 18 (FIG. 1). Audio plug 18 may be plugged into female receptacle 12. Female receptacle 12 and male plug 10 may be connected together electrically via a multi-core cable 7. Transmitter module 5a is shown as mechanically attached to sleeve 6M of male plug 10. Transmitter module 5a may also be electrically connected to male plug 10, tip 1 and collars 2 and 3 via connection to multi-core cable 7. Alternatively, transmitter module 5a may be mechanically attached to or located in sleeve 6F of female plug 12, in female receptacle 12 and/or male plug 10. Transmitter module 5a may be Bluetooth™ 3.0 Multi-Speaker Stereo Audio Module, part number BM90, Microchip Technology Inc. 2355 West Chandler Blvd, Chandler, Ariz., 85224-6199, USA. Transmitter module 5a may also be implemented using ZIGBEE™ wireless standard or any other wireless standard known in the art. Power may be supplied to transmitter module 5a using a battery or battery terminals (not shown) located inside adapter device 8a and/or power may be supplied through the audio connector, such as when a mini-USB connector is used and/or power may be supplied from use of another connector, e.g. mini-USB connector, when a pin type audio connector is used which is not configured to carry electrical power.

Adapter device 8a may be provided by a media research company or other third party, to a user (step 303). The user plugs male jack 18 of the earphones/headset/speaker into female receptacle 12 of device 8a and male plug 10 of device 8a is plugged into the audio connector of media device, e.g smart-phone 14. Transmitter module 5a, e.g. Bluetooth™ may pair and connect with a wireless receiver integral to media device 14 and an application running on media device 14 may monitor (step 307) audio content of media being consumed. Thus, The plugging in of device 8a between media device 14 and headset 28 (step 305), allows the media research company or other service such as SHAZAM™ to monitor (step 307) the audio content of media being played on media device 14 whilst the user listens to the audio content on earphone 15 or speaker. Use of wireless transmitter 5a additionally overcomes the possible problem of the internal microphone 16 of media device 14 to be muted, disconnected or otherwise disabled when a male plug of a headset 28 or speakers are plugged into media device 14 which may prevent monitoring of the media content (step 307). Moreover, use of wireless transmitter 5a connected with a receiver internal to media device 14 provides a signal of audio content being consumed to an application running on media device 14 without superimposed noise or interfering signals from external microphone 20.

In the field of information entertainment, applications such as SHAZAM™ may successfully monitor the media being consumed and provide to the user of media device 14 information regarding the media being consumed even when the user is listening with earphones 15 and/or speakers.

A "media device", as used herein refers to a device which plays and records audio and/or video, including but not limited to a computer system, mobile computers, smart-phones, tablet computers and/or other electronic devices such as media player/recorder.

The terms "earphone", "earphones" are used herein interchangeably. The term "headphone" and "headset" are used herein interchangeably and refer to earphones combined with a microphone.

The terms "audio jack", "audio plug", "male plug", "male connector" are used herein interchangeably to refer to a male type audio connector.

The term "audio connector" as used herein as part of the media device refers to a female type audio connector built in to the media device.

The term "signal" as used herein in the context of "audio input signal" and "audio output signal" may be analog or digital signals.

The term "listening device" as used herein may be but not limited to: a headset, an earphone, a speaker and/or a sound card.

The indefinite articles "an adapter device", "an audio coupling" as used herein, such as "an", "a" has the meaning of "one or more" that is "one or more devices", or "one or more audio couplings".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

What is claimed is:

1. An adapter device for enabling monitoring audio played on a media device which includes a built-in microphone and an audio connector, and the built-in microphone is disabled when an audio jack is plugged into the audio connector of the media device, the adapter device including:
   a male plug;
   a female receptacle electrically connected to the male plug;
   wherein the male plug when plugged into the audio connector of the media device and when the female receptacle mates with an audio plug of a listening device,
   a signal routing is configured to receive an audio output signal from the audio connector of the media device and to transmit wirelessly the audio output signal into a wireless input of the media device.

2. The adapter device of claim 1, wherein the signal routing includes:
a wireless transmitter having an electrical input and an electromagnetic wireless output signal, wherein the electrical input is operably connectable to the audio connector of the media device, wherein the wireless transmitter transmits the electromagnetic wireless output signal modulated by the audio output signal from the audio connector of the media device.

3. The adapter device of claim 2, wherein an electromagnetic receiver in the media device is configured to receive the electromagnetic wireless signal.

4. The adapter device of claim 2, wherein the electromagnetic wireless signal is an optical frequency or a radio frequency signal.

5. The adapter device of claim 1, wherein the signal routing includes a circuit, wherein the circuit includes at least one of a reactive or a resistive component.

6. The adapter device of claim 1, further including:
a multi-core cable connecting the male plug to the female receptacle.

7. The adapter device of claim 6, wherein a circuit is included in at least one of the male plug, the female receptacle and the multi-core cable.

8. The adapter device of claim 1, wherein the listening device is selected from the group consisting of: a headset, a speaker and a sound card.

9. A method for enabling monitoring audio played on a media device which includes a built-in microphone and an audio connector, and the built-in microphone is disabled when an audio jack is plugged into the audio connector of the media device, the method including:
providing an adapter device including: (i) a male plug, (ii) a female receptacle electrically connected to the male plug;
upon the female receptacle mating with an audio plug of a listening device and
upon the male plug plugging into the audio connector of the media device,
routing at least a portion of an audio output signal from the audio connector of the media device into a wireless input of the media device.

10. The method of claim 9, further comprising:
performing the routing by a wireless transmitter within the adapter device, wherein the wireless transmitter has an electrical input and an electromagnetic wireless output signal;
upon connecting the electrical input of the wireless transmitter to the audio connector of the media device, transmitting the electromagnetic wireless output signal, modulated by the audio output signal from the audio connector of the media device.

11. The method of claim 10, further comprising:
receiving the electromagnetic wireless signal by a wireless receiver in the media device.

12. The method of claim 11, further comprising:
enabling pairing and connecting between the wireless transmitter within the adapter device and the wireless receiver integral to the media device.

13. The method of claim 9, wherein said routing enables monitoring audio content being played on the media device whilst a user of the media device listens to the audio content.

14. The method of claim 9, wherein said mating enables monitoring audio content being played on the media device whilst a user of the media device listens to the audio content.

15. The method of claim 9, wherein said mating provides the audio output of the media device to the listening device, wherein the listening device is selected from the group consisting of: an earphone, a speaker or a sound card.

16. An adapter device including:
a male plug;
a female receptacle electrically connected to the male plug;
wherein the male plug when plugged into the audio connector of a media device and when the female receptacle mates with an audio plug of a listening device,
a signal routing is configured to receive an audio output signal from the audio connector of the media device and to transmit wirelessly the audio output signal into a wireless input of the media device.

17. The adapter device of claim 16, wherein the signal routing includes:
a wireless transmitter having an electrical input and an electromagnetic wireless output signal, wherein the electrical input is operably connectable to the audio connector of the media device, wherein the wireless transmitter transmits the electromagnetic wireless output signal modulated by the audio output signal from the audio connector of the media device.

18. The adapter device of claim 17, wherein an electromagnetic receiver in the media device is configured to receive the electromagnetic wireless signal.

19. The adapter device of claim 16, operable using direct current (DC) power supplied to the wireless transmitter from a battery selected from the group consisting of: a battery in the media device through the audio connector or through another connector from the media device and from a battery connectable to terminals in the adapter device.

* * * * *